(12) United States Patent
Huelsman et al.

(10) Patent No.: US 7,761,397 B2
(45) Date of Patent: Jul. 20, 2010

(54) RULE PROCESSING METHOD AND APPARATUS PROVIDING AUTOMATIC USER INPUT SELECTIONS

(76) Inventors: David L. Huelsman, 211 Cantwell Ct., Reynoldsburg, OH (US) 43068; Douglas M. Mair, 554 Timberlake Dr., Westerville, OH (US) 43061

(*) Notice: Subject to any disclaimer, the term of this patent is extended or adjusted under 35 U.S.C. 154(b) by 587 days.

(21) Appl. No.: 11/527,638

(22) Filed: Sep. 27, 2006

(65) Prior Publication Data

US 2007/0094204 A1 Apr. 26, 2007

Related U.S. Application Data

(63) Continuation-in-part of application No. 10/101,154, filed on Mar. 20, 2002, now Pat. No. 7,188,091, and a continuation-in-part of application No. 10/101,151, filed on Mar. 20, 2002, now Pat. No. 6,965,887.

(60) Provisional application No. 60/721,090, filed on Sep. 28, 2005, provisional application No. 60/278,655, filed on Mar. 21, 2001.

(51) Int. Cl.
*G06F 17/00* (2006.01)
*G06N 5/02* (2006.01)
(52) U.S. Cl. ........................................ 706/47
(58) Field of Classification Search ............. 706/47–48; 703/7
See application file for complete search history.

(56) References Cited

U.S. PATENT DOCUMENTS 5,212,771 A 5/1993 Gane et al.

(Continued)

FOREIGN PATENT DOCUMENTS

WO 9948031 9/1999

(Continued)

OTHER PUBLICATIONS

Aloul,F.A. et al. "ZBDD-Based Backtrack Search SAT Solver" International Workshop on Logic Synthesis (IWLS), New Orleans, Louisiana, pp. 131-136. 2002.*

(Continued)

*Primary Examiner*—David R Vincent
*Assistant Examiner*—Benjamin Buss
(74) *Attorney, Agent, or Firm*—Stolowitz Ford Cowger LLP

(57) ABSTRACT

An improvement in decision automation employing a ZDD rule model indicative of a business or engineering rule to provide decision support to a user. The computer-implemented improvement automatically identifies compliant inputs for the rule processing system according to at least one input initially supplied by a user, and is particularly useful for determining product configuration, engineering designs, various outcome of planning scenarios, etc. Once a user selects an initial value(s), remaining compliant values unique to the user-selected value(s) are automatically identified. The improvement reduces time required to manually select inputs. In one embodiment, the improvement includes an I/O interface to enable the user to choose and observe inputs, an autoselect ZDD constructed from compliant inputs of the rule model, and a ZDD processing module that processes said autoselect ZDD in order to provide for the user a set compliant inputs for the ZDD rule model according to the user input. The automatic input selection routine may be executed at decision automation runtime, or executed and stored a priori for subsequent processing during runtime.

22 Claims, 16 Drawing Sheets

U.S. PATENT DOCUMENTS

| | | | |
|---|---|---|---|
| 5,301,284 | A | 4/1994 | Estes et al. |
| 5,311,424 | A | 5/1994 | Mukherjee et al. |
| 5,367,619 | A | 11/1994 | Dipaolo et al. |
| 5,576,965 | A | 11/1996 | Akasaka et al. |
| 5,630,025 | A | 5/1997 | Dolby et al. |
| 5,701,400 | A | 12/1997 | Amado |
| 5,745,765 | A | 4/1998 | Paseman |
| 5,805,462 | A | 9/1998 | Poirot et al. |
| 5,809,212 | A | 9/1998 | Shasha |
| 5,844,554 | A | 12/1998 | Geller et al. |
| 5,877,966 | A | 3/1999 | Morris et al. |
| 5,889,993 | A | 3/1999 | Kroeger |
| 5,910,898 | A | 6/1999 | Johannsen |
| 5,924,077 | A | 7/1999 | Beach et al. |
| 5,963,953 | A | 10/1999 | Cram et al. |
| 5,987,473 | A | 11/1999 | Jorgensen |
| 6,002,854 | A | 12/1999 | Lynch et al. |
| 6,016,394 | A | 1/2000 | Walker |
| 6,031,984 | A | 2/2000 | Walser |
| 6,035,305 | A | 3/2000 | Strevey et al. |
| 6,064,982 | A | 5/2000 | Puri |
| 6,076,080 | A | 6/2000 | Morscheck et al. |
| 6,163,876 | A | 12/2000 | Ashar |
| 6,182,275 | B1 | 1/2001 | Beelitz et al. |
| 6,256,618 | B1 | 7/2001 | Spooner et al. |
| 6,321,186 | B1 | 11/2001 | Yuan et al. |
| 6,327,581 | B1 | 12/2001 | Platt |
| 6,349,290 | B1 | 2/2002 | Horowitz |
| 6,385,617 | B1 | 5/2002 | Malik |
| 6,389,576 | B1 | 5/2002 | Lam et al. |
| 6,396,488 | B1 | 5/2002 | Simmons et al. |
| 6,424,962 | B1 | 7/2002 | Billon |
| 6,442,732 | B1 | 8/2002 | Abramovici et al. |
| 6,519,767 | B1 | 2/2003 | Carter et al. |
| 6,529,890 | B1 | 3/2003 | Pandit et al. |
| 6,535,883 | B1 | 3/2003 | Lee et al. |
| 6,556,978 | B1 | 4/2003 | Ginsberg et al. |
| 6,567,814 | B1 | 5/2003 | Bankier |
| 6,598,035 | B2 | 7/2003 | Branson et al. |
| 6,651,096 | B1 | 11/2003 | Gai et al. |
| 6,658,458 | B1 | 12/2003 | Gai et al. |
| 6,741,975 | B1 | 5/2004 | Nakisa et al. |
| 6,795,832 | B2 | 9/2004 | McGeorge et al. |
| 6,874,016 | B1 | 3/2005 | Gai et al. |
| 6,952,812 | B2 | 10/2005 | Abadir et al. |
| 6,961,913 | B1 | 11/2005 | Okazaki et al. |
| 6,983,187 | B2 | 1/2006 | Kern |
| 7,130,783 | B1 | 10/2006 | Harer et al. |
| 7,188,333 | B1 | 3/2007 | LaMotta et al. |
| 2001/0029499 | A1 | 10/2001 | Tuatini et al. |
| 2002/0065701 | A1 | 5/2002 | Kim et al. |
| 2002/0078431 | A1 | 6/2002 | Reps |
| 2002/0095645 | A1 | 7/2002 | Rodeh |
| 2002/0108093 | A1 | 8/2002 | Moondanos et al. |
| 2002/0112213 | A1 | 8/2002 | Abadir et al. |
| 2002/0165701 | A1* | 11/2002 | Lichtenberg et al. ........... 703/7 |
| 2002/0178432 | A1* | 11/2002 | Kim et al. .................... 716/18 |
| 2003/0220926 | A1* | 11/2003 | Huelsman et al. .......... 707/100 |
| 2004/0138988 | A1 | 7/2004 | Munro et al. |
| 2004/0181500 | A1* | 9/2004 | Huelsman et al. .............. 707/1 |
| 2004/0260667 | A1 | 12/2004 | Huelsman et al. |
| 2005/0080648 | A1 | 4/2005 | Huelsman |
| 2005/0108183 | A1 | 5/2005 | Huelsman et al. |
| 2007/0112767 | A1 | 5/2007 | Tilley |
| 2007/0159304 | A1 | 7/2007 | Agarwal et al. |
| 2007/0290791 | A1 | 12/2007 | Batra |

FOREIGN PATENT DOCUMENTS

| | | |
|---|---|---|
| WO | 03/081478 | 10/2003 |

OTHER PUBLICATIONS

Mishchenko,A. "An Introduction to Zero-Supressed Binary Decision Diagrams". 2001.*

Minato,S-I. "Graph-Based Representations of Discrete Functions", Chapter 1 of Representations of Discrete Functions edited by Sasao,T. et al. Kluwer Academic Publishers, 1996.*

Jacobi et al.; Generating Prime and Irredundant Covers for Binary Diagrams; Design Automation, 1992, Proceedings 3rd European Conference; Mar. 1992; pp. 104-108.

Minato, Zero-Suppressed BDDs for Set Manipulation in Combinatorial Problems, Proceedings of the 30th Conference on Design Automation, Jul. 1993, pp. 272-277.

Cabodi, et al., Symbolic Traversals of Data Paths with Auxilary Variables, IEEE, 1994, pp. 93-96.

Panda, et al., Symmetry Detection and Dynamic Variable Ordering of Decision Diagrams, Proceedings of the 1994 IEEE/ACM International Conference on Computer-Aided Design, Nov. 1994, pp. 628-631.

Cosnard, et al., Automatic Task Graph Generation Techniques, Proceedings of the Twenty-Eighth Hawaii International Conference on System Sciences, Vo. 2, Jan. 3, 1995, pp. 113-122.

Bryant, Binary Decision Diagrams and Beyond, Enabling Technologies for Formal Verification, IEEE, 1995, pp. 236-243.

Anderson, An Introduction to Binary Decision Diagrams, University of Denmark, Oct. 1997, pp. 8-11.

Cugola, G, et al., Exploiting an event-based infrastructure to develop complex distributed systems, Proceedings of the 20th International Conference on Software Engineering, Apr. 1998, pp. 261-270.

Gottlob, et al., The complexity of acyclic conjunctive queries, 39th Annual Symposium on Foundations of Computer Science Proceedings, Nov. 8, 1998, pp. 706-715.

Yang, Optimizing Model Checking Based on BDD Characterization,Thesis, Carnegie Mellon U.,May 1999, pp. 9-11.

Ejnioui, et al., Design Partitioning on Single-chip Emulations Systems, Thirteenth International Conference on VLSI Design, Jan. 3, 2000, pp. 234-2391.

Kurihara, et al., BDD Encoding for Partial Order Constraints and its Application to Expert Systems in Software Verification Domains, 2000 IEEE International Conference on Systems, Man, Cybernetics, vol. 3, 8-11, Oct. 2000, pp. 2062-2067.

Beck, M., et al., Enabling Full Service Surrogates Using the Portable Channel Representation, Proceedings of the Tenth International Conference on World Wide Web, Apr. 2001, pp. 376-385.

European Patent Office; PCT/US2007/079793; International Search Report and Written Opinion; Feb. 7, 2008.

"Array". Microsoft Computer Dictionary, Fifth Edition. May 1, 2002.

European Patent Office; PCT/US2007/079797; International Search Report and Written Opinion; Feb. 7, 2008.

Moller, J., HR Andersen, H Hulgaard, "Product Configuration over the Internet presented at ", The 6th Informs Conference on Information Systems and Technology, Nov. 3-4, 2001, Miami Beach, Florida.

Moller, Jesper, "Configuration and E-commerce", IFORS Jul. 2002.

Minato, S., "Zero-Suppressed BDDs and Their Applications", International Journal on Software Tools for Technology Transfer, vol. 3, No. 2, pp. 156-170, Springer, May 2001.

USPTO; PCT/US2003/08265; International Search Report and Preliminary Examination Report; Aug. 13, 2003.

Jacobi et al; Generating Prime and Irredundant Covers for Binary Decision Diagrams; Design Automation, 1992; Proceedings 3rd European Conference; Mar. 1992; pp. 104-108.

European Patent Office; PCT/US2007/079797; International Preliminary Report on Patentablility; Mar. 2009.

European Patent Office; PCT/US2007/079793; International Preliminary Report on Patentablility; Mar. 2009.

http://vlsi.colorado.edu/~fabio/CUDD/nodel.html, site visited Jun. 11, 2009.

USPTO; File History U.S. Appl. No. 10/101,151 to Huelsman et al., filed Mar. 20, 2002; Part I, Mar. 2002 through Feb. 2005.

USPTO; File History U.S. Appl. No. 10/101,151 to Huelsman et al., filed Mar. 20, 2002; Part II, Apr. 2005 through Nov. 2008.

USPTO; File History U.S. Appl. No. 10/101,154 to Huelsman et al., filed Mar. 2, 2002.

USPTO; File History U.S. Appl. No. 11/710,972 to Huelsman et al., filed Feb. 27, 2007.

USPTO; File History U.S. Appl. No. 12/170,369 to Huelsman et al., filed Jul. 9, 2008.

USPTO; File History U.S. Appl. No. 10/198,100 to Huelsman et al., filed Jul. 19, 2002.

USPTO; File History U.S. Appl. No. 10/198,098 to Huelsman et al., filed Jul. 19, 2002.

USPTO; File History U.S. Appl. No. 11/914,062 to Huelsman et al., filed Nov. 15, 2007.

* cited by examiner

| Exemplary Definition & Layout of Rule Model | | |
|---|---|---|
| Attribute Name | Attribute Number | Enumeration Names and Number |
| Bundles | 0 | Best (0), Better (1), Cheap (2), Good (3) |
| CPU | 1 | P4 (4), P5 (5), P6 (6) |
| DVD | 2 | 1x (7), 2x (8), 4x (9), 8x (10) |
| Hard Drive | 3 | 120 Gig (11), 250 Gig (12), 80 Gig (13) |
| Memory | 4 | 1GB (14), 2 GB (15), 512 MB (16) |
| Shipping Company | 5 | FedEx (17), UPS (18), USPS (19) |
| Shipping Method | 6 | Next Day (20), 2 Day (21), Ground (22) |

Fig. 3

|  | Enumeration List | Group List |
|---|---|---|
| Selection Input Floating | 2, 7 | 0, 1 |
| Selection Input Fixed | 2, 4, 7, 11, 16 | 0, 1, 2, 3, 4 |

192 — Selection Input Floating
194 — Selection Input Fixed

Fig. 14

| Bundles | | | CPU | | | DVD | | | | Hard Drive | | | Memory | | |
|---|---|---|---|---|---|---|---|---|---|---|---|---|---|---|---|
| Best | Better | Cheap | Good | P4 | P5 | P6 | 1X | 2X | 4X | 8X | 120 Gig | 250 Gig | 80 Gig | 1 GB | 2 GB | 512 MB |
| 1 | 1 | 1 | 1 | 1 | 0 | 0 | 1 | 1 | 1 | 1 | 1 | 1 | 1 | 0 | 0 | 1 |

Include Result

196 — Bundles
197 — Best
198 — (row)

Exclude Floating Result

| Bundles | | | CPU | | | DVD | | | | Hard Drive | | | Memory | | |
|---|---|---|---|---|---|---|---|---|---|---|---|---|---|---|---|
| Best | Better | Cheap | Good | P4 | P5 | P6 | 1X | 2X | 4X | 8X | 120 Gig | 250 Gig | 80 Gig | 1 GB | 2 GB | 512 MB |
| 1 | 1 | 0 | 1 | 0 | 0 | 0 | 0 | 1 | 1 | 1 | 0 | 0 | 0 | 0 | 0 | 0 |

200 — Bundles row
201 — values row header
202 — result row

Fig. 16B

Exclude Fixed Result

| 1 | 1 | 0 | 1 | 0 | 0 | 0 | 0 | 1 | 1 | 1 | 0 | 0 | 0 | 0 | 0 | 0 |

203

| Final NOR Result | | | | | | | | | | | | | |
|---|---|---|---|---|---|---|---|---|---|---|---|---|---|
| Bundles | | | CPU | | | DVD | | | | Hard Drive | | | Memory | | |
| Best | Better | Cheap | Good | P4 | P5 | P6 | 1X | 2X | 4X | 8X | 120 Gig | 250 Gig | 80 Gig | 1 GB | 2 GB | 512 MB |
| 0 | 0 | 1 | 0 | 1 | 0 | 0 | 1 | 0 | 0 | 0 | 1 | 1 | 1 | 0 | 0 | 1 |

Fig. 17

RULE PROCESSING METHOD AND APPARATUS PROVIDING AUTOMATIC USER INPUT SELECTIONS

CROSS-REFERENCE TO RELATED PATENTS AND PATENT APPLICATIONS

The present application claims priority to and is a continuation-in-part of U.S. patent application Ser. No. 10/101,154, filed Mar. 20, 2002 (now U.S. Pat. No. 7,188,091) which, in turn, claims priority to U.S. Provisional Patent Application 60/278,655, filed Mar. 21, 2001. The present application further claims priority to U.S. Provisional Application No. 60/721,090, filed Sep. 28, 2005, in the name of the same inventors hereof.

The present application claims priority to and is a continuation-in-part of U.S. application Ser. No. 10/101,151, filed Mar. 20, 2002 (now U.S. Pat. No. 6,965,887) and Ser. No. 10/101,154, filed Mar. 20, 2002 (now U.S. Pat. No. 7,188,091), each of which is incorporated by reference herein.

BACKGROUND

This invention relates to a rule processing system or method that provides automatic decision support, but more specifically, to an improvement that enables automatic selection or identification of rule inputs based on an initial input supplied by a user.

During automated decision support, a user may input one or more selections of rule parameters in order to attain satisfiability of a business or engineering rule, such as product configuration rule or specifications for an engineering system. Generically, user selections may take the form of selected enumeration values of attributes that characterize the rule. In a product configuration rule for a desktop computer system, for example, an attribute may comprise bundle type and selectable enumerations of that attribute may comprise Multimedia, Power PC, Business Workstation, or Entry Level. Depending on an initial selection of bundle type, enumerations of other product attributes (e.g., CPU speed, DVD speed, Hard Drive Capacity, RAM memory size, etc.) may or may not be compatible.

In order to lessen the amount of effort required of the user to select appropriate enumerations of other attributes once other attributes are selected, it is desirable to provide the user with automatic selections or identification of enumerations for the other product attributes, i.e., to automatically identify or suggest compatible inputs that satisfy the product configuration rule based on the user's manually-supplied inputs. In other words, it is desirable to automatically identify enumerations that are valid with each other and also valid with previous selections made by the user. Such automatically-supplied advice guides the user in choosing correct enumerations that reside in various valid combinations of attributes and enumerations and speeds attainment of rule compliance. In addition to product configuration, such automatic selection of enumerations may be applied to any other type of business or engineering rule processing system or method.

In the related disclosures over which the present invention is an improvement, the rule being automated is modeled by a zero-suppressed binary decision diagram (ZDD), but may also take the form of BDDs (binary decision diagrams) or DAGs directed acyclic diagrams). Using a ZDD rule model, the user's inputs are converted to a traversal ZDD which is used to traverse the rule model in order to produce an indication of satisfiability as well as conflict and select advice. Conflict and selection advice informs the user which entries invoke compliance and which entries invoke noncompliance after the user has made his or her selections of enumerations. Based on the advice, the user may change the selections according to desired configuration or other conditions.

SUMMARY OF THE INVENTION

In accordance with a first aspect of the invention, there is provided in a computer-implemented rule processing system utilizing a ZDD rule model that responds to user inputs by providing advice to a user for achieving compliancy of the rule model, an improvement comprising an autoselect system implemented with the rule processing system to identify a set of compliant inputs based on at least one initial user input chosen by the user where the autoselect system includes a user interface to enable the user to enter at least one user input and a processor to automatically generate and indicate to the user other compliant inputs of the set based on the user's initial input. To identify the other compliant inputs, the processor utilizes an autoselect ZDD constructed from compliant inputs of the rule model. Inputs may be in the form of a selection of attributes of a business or engineering rule and a selection of enumerations of the attributes.

According to another aspect of the invention, a computer-implemented rule processing system utilizing a ZDD rule model that responds to selection of attributes and enumerations thereof in order to provide selection advice to a user for achieving compliancy of the rule model includes an improvement comprising an autoselect system implemented with the rule processing system in order to provide additional compliant selections based on at least one initial input supplied by the user. In this aspect, the autoselect system includes a user interface to enable the user to enter the initial input, an autoselect ZDD constructed from compliant inputs of the rule model, and a processing module responsive to the initial input of the user to automatically provide the additional compliant selections.

In yet another aspect of the invention, there is provided in combination with a rule processing system employing a ZDD rule model indicative of a business or engineering rule to provide decision support to a user, a computer-implemented system to automatically identify compliant inputs for the rule processing system according to at least one user input wherein the computer-implemented system comprises an I/O interface to enable the user to choose and observe inputs, an autoselect ZDD constructed from compliant inputs of the rule model, and a ZDD processing module that processes the autoselect ZDD in order to provide for the user a set compliant inputs for the ZDD rule model according to the at least one user input. Further, the processing module may enable the user to change an initial input and, in response thereto, to provide alternative compliant inputs based on a change in the initial user input.

In a further aspect of the invention, a computer-implemented rule processing system to determine satisfiability of a business or engineering rule represented by a zero-suppressed binary decision diagram (ZDD) rule model comprises an execution module to indicate compliancy of the rule according to selection of attributes and enumerations values of the attributes, an autoselect module that provides automatic selection of enumeration values based on selection of an initial value of at least one enumeration, a user interface to enable a user to select a value of at least one enumeration, and a processing module to determine compliant enumeration values of other attributes according to the enumeration value selected by the user and to provide to the user compliant enumeration values of the other attributes. In addition, the processing module may iteratively enable the user to select an alternative enumeration value whereby, in response, the processing module determines and identifies other compliant enumeration values based on the alternative enumeration value selected by the user.

In yet another aspect of the invention, there is provided in a computer-implemented rule processing method to determine satisfiability of a ZDD representation of a business or engineering rule, a method of providing a set of compliant enumeration values for respective attributes of the rule comprising the steps of obtaining a user selection of at least one enumeration value of an attribute, determining a set of compliant enumeration values of other attributes according to user selection, providing a complete set of compliant enumeration values to the user, and iteratively enabling the user to select other enumeration values whereby to provide further complete sets of compliant enumeration values to the user.

In yet another aspect of the invention, there is provided in a computer-implemented method of rule processing utilizing a zero-suppressed binary decision diagram (ZDD) to provide decision support, a method of automatically providing a user with additional compliant input selections based on at least one initial user input supplied by the user comprising the steps of providing a user interface to indicate possible inputs to the ZDD; enabling the user to enter at least one input; in response to an input selected by the user, generating a set of additional inputs that are compliant with each other and compliant with the input(s) entered by the user; and indicating the set of additional compliant inputs to said user. Indicating may occur by displaying results or selection advice on a computer monitor.

In yet a further aspect of the invention, there is provided a computer-readable medium to effect automatic identification of inputs during automated rule processing of a ZDD rule by a data processing system where the medium comprises program instructions to effect display on a graphical user interface of selectable inputs for the ZDD rule, to effect selection by the user of at least one input, to build an autoselect ZDD from compliant inputs of the ZDD rule, to generate a set of compliant inputs based on an input selected by the user, and to indicate to the user said set of compliant inputs according to an input selected by the user.

Other features and aspects of the invention will become apparent upon review of the following disclosure taken in connection with the accompanying drawings. The invention, though, is pointed out with particularity by the appended claims.

BRIEF DESCRIPTION OF THE DRAWINGS

FIG. 3 is a table describing the attributes and enumerations of a computer system configuration rule exemplified throughout this disclosure.

FIG. 14 shows Include advice produced by the invention in the form of two arrays of enumeration inputs called Selection Input Floating and Selection Input Fixed.

FIG. 15 shows advice indications for the respective Bundles, CPU, DVD, Hard Drive, and Memory attribute groups.

FIG. 16A shows advice computation using floating AutoSelected Attributes.

FIG. 16B shows advice computation using a fixed AutoSelect value instead of the floating AutoSelect Attributes.

FIG. 17 shows the results of NOR'ing Include Results and the Exclude Results to produce an advice array.

DESCRIPTION OF ILLUSTRATIVE EMBODIMENTS

AutoSelect is an algorithm that provides automatic selection or identification of a complete set of attributes and enumerations of a rule based on a partial set of attributes and enumerations supplied by a user. AutoSelect may be implemented as a process or a system that implements a process.

To implement Autoselect, a rule modeler during a rule definition phase designs or builds a rule model while assigning some attributes to be of the AutoSelect type. Once defined, an AutoSelect attribute may have two states, floating (denoted [FL}) or fixed (denoted [FX}). In certain cases, more than two states may be provided but the illustrated embodiments disclosed herein assume only two states.

In the fixed state, the user has made a choice of the value of an attribute so the particular enumeration value chosen becomes fixed. In the floating state, no value at all for the attribute is fixed and the system or method according to the present invention automatically determines the appropriate enumeration value for the attribute and either selects the value(s) on behalf of the user or communicates the value(s) to the user.

Complications, however, may arise because enumeration values for AutoSelected attributes must be valid with each other and also valid with other, preferably all, user-selected enumerations. This implies that all valid combinations of such attributes are known all the times. It is relatively easy to ascertain if any one combination is valid but to obtain all valid combinations is a more complex problem. This is similar to the Boolean Satisfiability Problem, which has an NP-complete solution. NP-complete suggests that no polynomial solution is known to exist.

Figure 1:
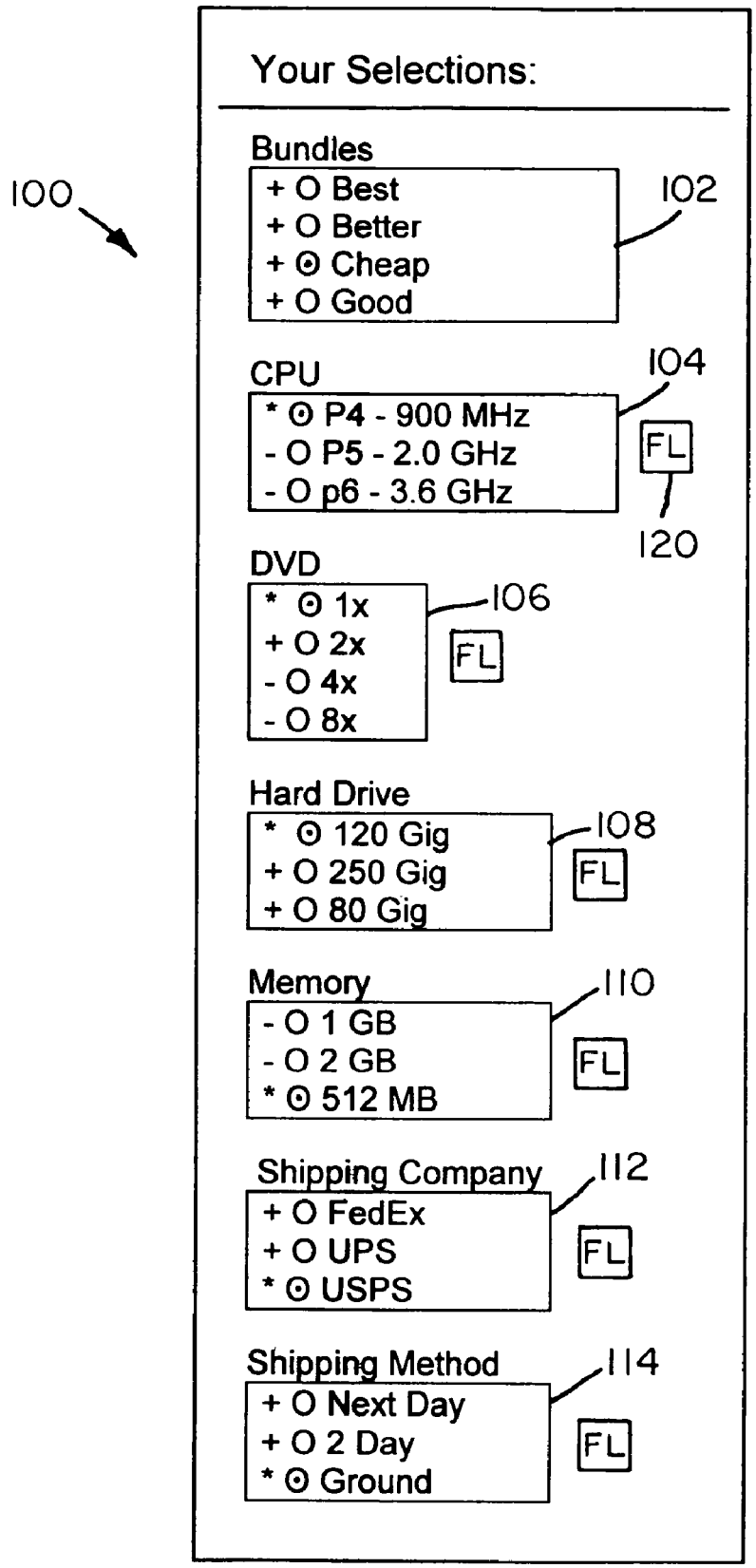
FIG. 1 is a screen print of a graphical user interface (GUI) depicting a user selection of a "Cheap" enumeration within a bundle type attribute for a desktop computer system along with a number of "floating" attributes (CPU, DVD, Hard Drive, Memory, Shipping Company, and Shipping Method) each having an enumeration that is automatically selected in accordance with the a method or system of the present invention.

The example of FIG. 1 is used throughout this disclosure to describe the invention. The example concerns selecting/defining components of a computer system bundle, e.g., a combination of compatible hardware and software components for a computer system where an end user (or purchaser) is provided with a number of selections. At some point after the user begins the component selection process, the system or method automatically chooses or suggests enumeration values for the remaining attributes (CPU, DVD, etc) that are valid with each other and also valid with prior user selections for the bundle. Afterwards, the user may fine-tune the selections by rejecting one or more of the automatically selected values by changing them to meet his or her particular needs.

The graphical user interface of FIG. 1, i.e., a screen print 100, is presented to a user on a computer monitor. The initial state of enumeration selections shown is valid for all attribute groups, which include Bundles (or quality), CPU speed, DVD speed, hard drive capacity, RAM memory capacity, shipping company, and shipping method. Each such attribute has a number of enumerations. The initial group of attributes and enumerations having a compatible state, in the example of FIG. 1, defines a low-quality or "cheap" computer bundle. Selection of the "cheap" enumeration in the "bundles" group causes other attributes, which are AutoSelected, to assume the most recommended valid combination of enumerations within their respective attribute groups. As a whole, the initial group of enumeration selections are the "cheap" selection in CPU type attribute box 102, "Pentium 4-900 Mhz" in CPU attribute box 104, "1×" speed in DVD type attribute box 106, "120 Gig" selection in Hard Drive capacity attribute box 108, "512 MB" in RAM memory size attribute box 110, "USPS" shipping in shipper attribute box 112, and "Ground" as the shipping method in attribute box 114. The "floating" icons 120 next to the AutoSelect attribute boxes 102-114 indicate that the attribute lays in a floating state, which means that the system or method herein described automatically changes the preselected enumeration values based on alternative user selections.

Figure 13:
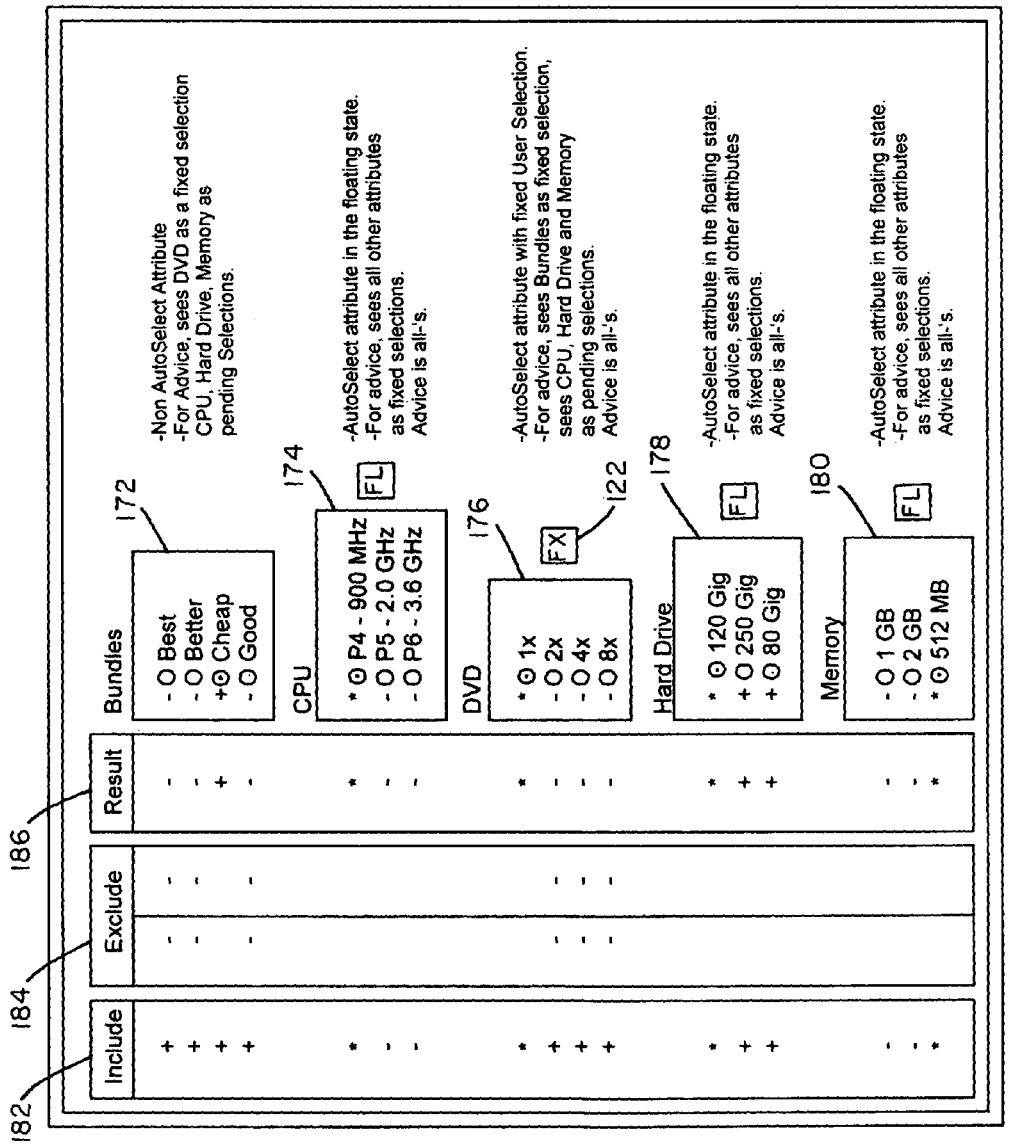
FIG. 13 is a table of results generated by the process of FIG. 12, which separately shows Include and Exclude enumerations.

The icon can be either floating or fixed (example of fix icon 122 is shown in FIG. 13). If the icon is fixed, then the attribute's enumeration value is fixed and cannot be changed automatically. To unfix the enumeration value, a user may click on the icon to toggle it back to floating.

Figure 2:
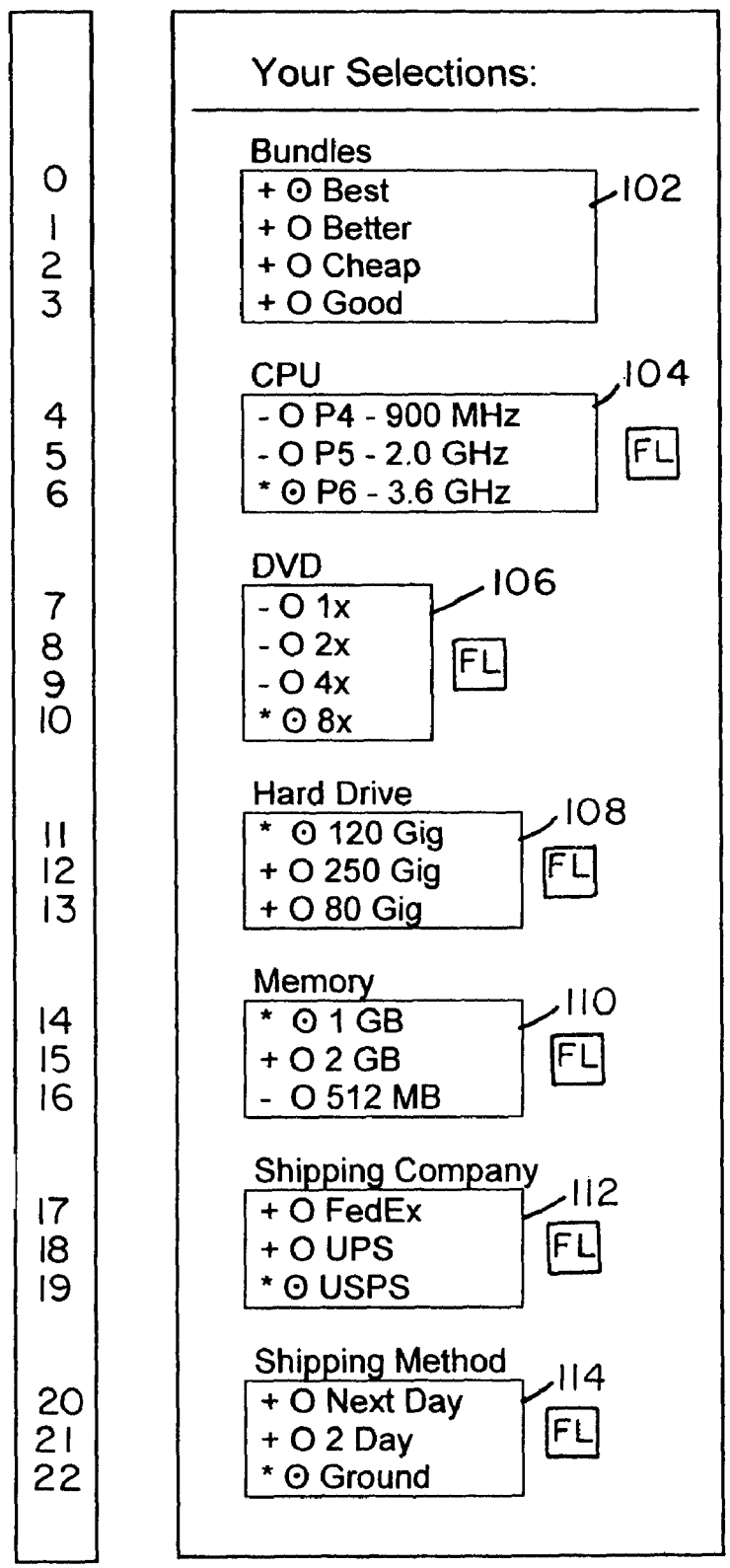
FIG. 2 shows a screen print similar to FIG. 1, but having the "Best" enumeration being user-selected in the Bundles attribute whereby alternative enumerations are automatically selected or identified for the remaining attributes in accordance with the present invention (but additionally including an enumeration/index value column on the left to help explain the invention).

If the user selects the Best value for the enumeration in the Bundles attribute box 102, as indicated in FIG. 2, the rule processing system or method thereof automatically effects a change in floating enumeration values of the other attributes 104-114, also indicated in FIG. 2. With a single change in a user selection, the system or method advantageously automatically selects the proper values for the other six attributes, such as, P6 for CPU type 104, 8× for DVD speed 106, one hundred twenty Gigs for hard drive capacity 108, one GB for RAM size 110, USPS for shipper identity 112, and Ground for shipping method 114. Thus, the AutoSelect algorithm and/or apparatus implementing the same guarantees that all of the selections are valid together, and are also valid with the user selection. Since much work in selecting valid hardware/software combinations of the computer bundle is accomplished by the rule processing system, the user need only fine-tune the computer bundle. It should also be noted that even though examples described herein may refer to "all" elements, values, components, etc., "all" need not be required to obtain the benefit of the invention.

In order to support the AutoSelect feature, AutoSelect ZDDs may be built at the time of rule packaging and subsequently used by the execution engine at runtime to determine AutoSelect enumeration values for the various attribute. AutoSelect ZDDs are also used at runtime during advice determination. During creation of the rule, the modeler specifies which attributes are to be AutoSelected. The modeler may also specify the AutoSelect Priority of the attribute. Other details of the process of model creation including the concepts of Attributes, Enumerations, and Packaging remain unchanged from the process described in the common-owned, incorporated Ser. Nos. 10/101,151 and 10/101,154 applications.

Creating AutoSelect Components:

During rule packaging, the rule modeler chooses which attributes are to be AutoSelect attributes. Then, the set of other attributes related to the AutoSelected attributes is found. The union of these two sets identifies the attributes involved in the AutoSelect feature.

A next step involves splitting up of the involved attributes into groups of independent attributes called AutoSelect components. A standard transitive closure routine as described by Judith Gerstling, *Mathematical Structures for Computer Science*, Forth Edition, W. H. Freeman and Company (1999) is used to split up the attributes into the independent groups. Later, at runtime, these AutoSelect components are processed to determine the valid combinations of AutoSelected enumeration values. Splitting up the AutoSelect attributes into groups reduces the size of the AutoSelect component ZDD.

AutoSelect Components:

FIG. 3 illustrates an example having seven attribute groups 0, 1, 2, 3, 4, 5 and 6. Attribute groups 0, 1, 2, 3 and 4 (Bundle, CPU speed, DVD speed, Hard Drive capacity, Memory capacity) are interrelated by rules so the transitive closure routine places them into a first AutoSelect component. Attribute groups 5 and 6 (Shipping Company and Shipping Method) define a second AutoSelect component.

Critical Attributes:

Sometimes, when attempting to split the attributes into components for more convenient manipulation, a component may still be too large because too many attributes are interrelated. A method to determine such condition involves counting the number of attributes in an AutoSelect component. If the number of attributes exceeds thirty, for example, the group may be deemed too large. Another method of determining whether the component group is too large entails attempting to create its associated ZDD. If this takes too long or if memory need is exceeded, then the components may be deemed too large.

If an AutoSelect component is too large, the component may be segmented using another method that splits up the attributes around non-AutoSelected attributes. These attributes are called Critical Attributes.

The best candidate for a Critical Attribute around which to segment components is an attribute that is non-AutoSelected and related by rules to many other attributes. So another aspect of the invention concerns searching for such attributes. Once these attributes are found, a transitive closure routine is used to split up the attributes as if the Critical Attribute did not exist. Such a routine is further described in sister application filed of even date herewith by the same inventors hereof, entitled "Rule Processing Method and Apparatus Providing Exclude Cover Removal To Simplify Selection and/or Conflict Advice." This creates a number of groups that are again independent of each other, except that only the Critical Attribute(s) relates these groups to each other If a Critical Attribute is found that splits up the AutoSelect components sufficiently, the system or method adds the Critical Attribute to all of these groups and continues. Otherwise, the next most related attribute is used as the Critical Attribute and the group is split again.

In the illustrated example, there are two AutoSelect components and both of the components have less than thirty attributes. Thus, the components need not be further segmented.

At this point one or more AutoSelect components exists; a list of the set of attributes in each component; and a set of zero, one, or more critical attributes for each component, all of which must be provided to the runtime engine for proper execution. In addition, the attributes in each of the AutoSelect Components must be placed in an AutoSelect Priority order prior to execution. The illustrated system or method establishes an arbitrary order by ranking the attributes in alphabetical order of their names and then allows the modeler to make any further adjustments desired.

The two AutoSelect components in the illustrated example are put into AutoSelect Priority order as attributes 0, 1, 2, 3, 4 in the first AutoSelect Component and attributes 5 and 6 in the second AutoSelect Component. The AutoSelect Priority order is used at runtime by engine, so the system or method reports the AutoSelect Priority ordering to the execution engine as well.

Building AutoSelect ZDDs:

After determining the AutoSelect components, ZDDs for each of these groups are created. The resulting ZDDs thus contain every valid combination for each AutoSelect component and may therefore grow quite large, thus the importance of making each component as small as possible.

Figure 4:
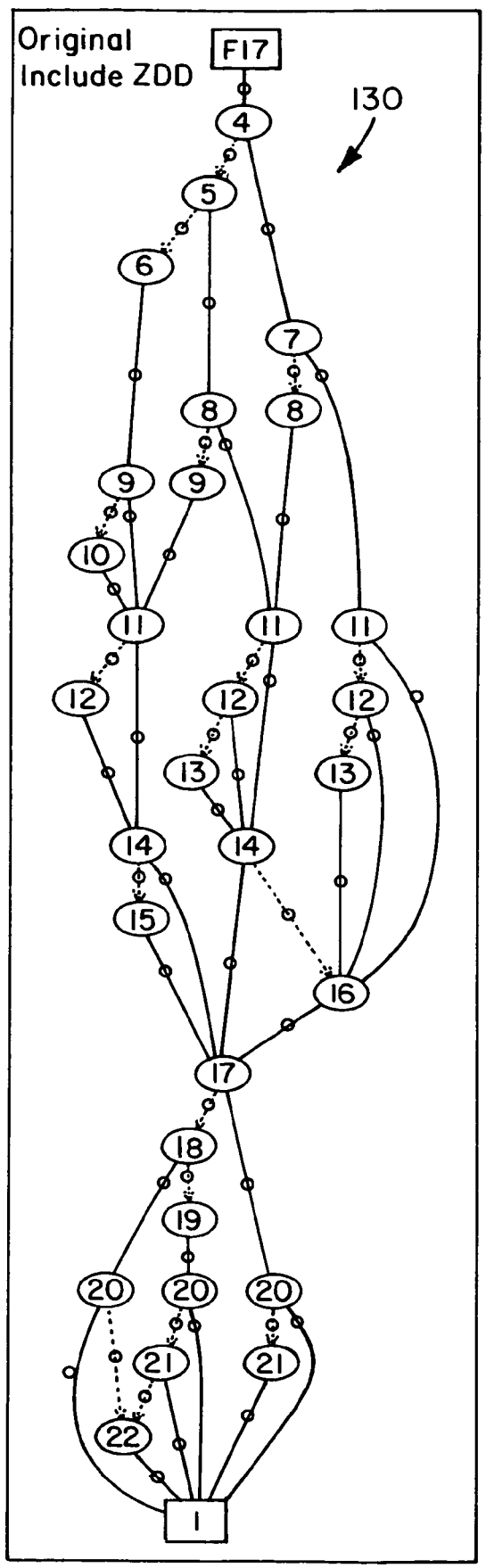
FIG. 4 is a zero-suppressed binary decision diagram (ZDD) representing the original Include component of the configuration rule characterizing compatible or allowable configurations of the computer system described in FIG. 3.
Figure 5:
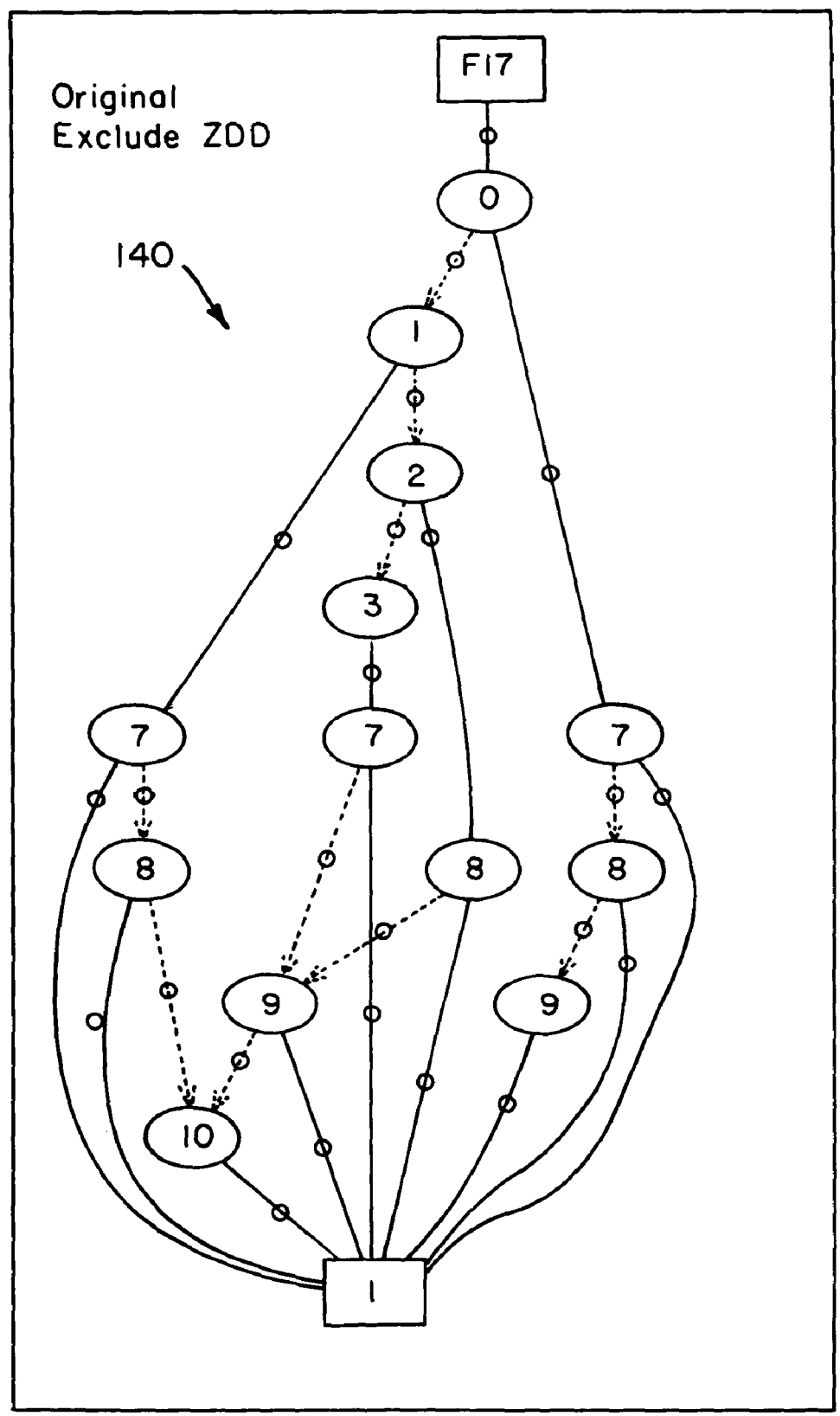
FIG. 5 is a ZDD representing the original Exclude component of a product configuration rule characterizing compatible or allowable configurations of the computer system described in FIG. 3.

In the exemplary model, valid combinations are split between Exclude ZDD 130 and Include ZDD 140 respectively shown in FIGS. 4 and 5. As subsequently described, the system or method incrementally creates a new ASInclude ZDD. The new ZDD has the same structure as the Include ZDD in the '151 or '154 application. The following processes are performed for each AutoSelect component:

Reordering the ZDDs
Removing Unused Enumerations
Adding Always Paths to Include ZDD
Transferring Exclude to Include ZDD
Removing Excluded Paths
Storing the ZDD in a pac file.

These steps are described in detail below for one of the AutoSelect components with the understanding that the same or similar steps are performed with respect to the other component(s). The Include and Exclude ZDDs are the result of packaging the rules in the rule model as described in the related disclosures. The ASInclude ZDD 130 (FIG. 4) started out as a copy of the Include ZDD representing the configuration of rule attributes and enumerations of the FIG. 3 rule model while the ASExclude ZDD 140 (FIG. 5) started out as a copy of Exclude ZDD of the FIG. 3 rule model.

Reordering the ZDDs:

Using standard ZDD reordering algorithms, e.g., those algorithms described by Fabio Somenzi in CUDD: CU Decision Diagram Package, the ASInclude ZDD 130 and the ASExclude ZDD 140 are reordered to place the enumerations for the first AutoSelect components at the top of the respective ZDDs in the same order. By placing them in the same order it is possible to perform meaningful operations between the two ZDDs.

As shown in FIG. 4, the exemplary ASInclude ZDD 130 includes enumeration nodes 4 through 22. Enumeration nodes 17 through 22 (e.g., selections for Shipping Company and Shipping Method) are not involved in the first AutoSelect component, so after reordering they are placed at the bottom of ZDD 130. This is where they were initially so the ASInclude ZDD does not change in this step.

As shown in FIG. 5, the ASExclude ZDD includes enumeration nodes 0, 1, 2, 3, 7, 8, 9 and 10. All of these enumerations are included in the AutoSelect component. The reordering technique applied to the ASExclude ZDD 140 was the same as that applied to the ordering of the ASInclude ZDD 130 so the ASExclude ZDD remains the same after reordering.

Figure 6:
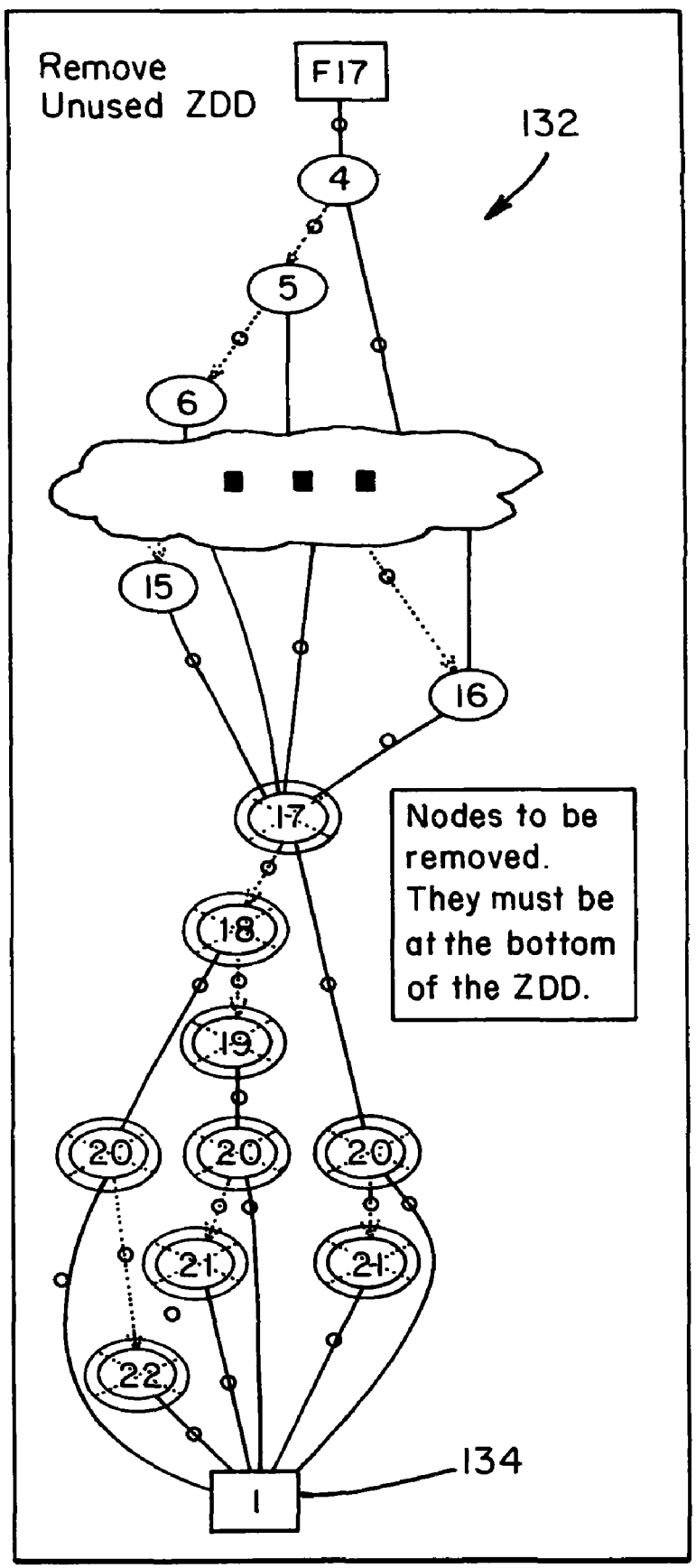
FIG. 6 illustrates removal of unused ZDD nodes (e.g., removal of unused computer configurations) of the Include ZDD shown in FIG. 4.

Removal of Unused Enumerations:

FIG. 6 illustrates removal of enumeration nodes from the resulting ASInclude ZDD that were not involved in any of the AutoSelect components. The routine that does this removal requires that any unused enumerations at the bottom of the ZDD. FIG. 6 shows the ASInclude ZDD 130 from our example for the first AutoSelect component with the nodes in the ZDD to be removed (i.e., nodes 17-22) being marked by an "X" through them.

The algorithm to do this traverses every path in the ASInclude ZDD 132. As indicated above, it is essential that the enumerations in this AutoSelect component be located at the top of the ASInclude ZDD 132. As the algorithm traverses the paths, it checks if the node index is to be removed. When it hits the first node to be removed, the algorithm immediately reroutes that edge to the constant "1" node 134.

In the illustrated example, the algorithm traverses down from node 4 to node 16, examines the THEN leg of node 16 to find node 17, which is the topmost enumeration to be removed, and so the THEN leg of node 16 is rerouted to the constant "1" node 134.

This traversing and rerouting occurs for every path in the ZDD and eventually, nothing will be pointing to node 17. At that point node 17 and all the nodes below it have been removed from the ZDD.

Figure 7:
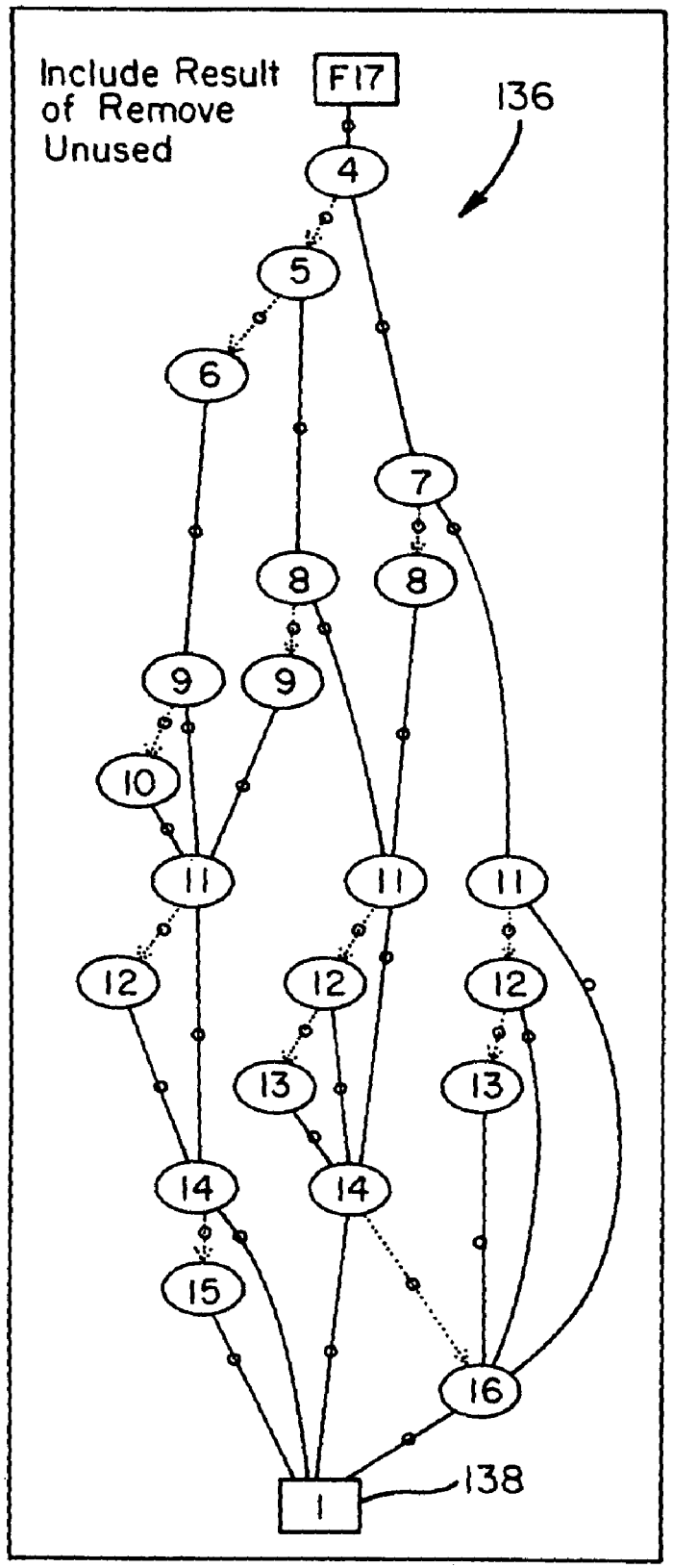
FIG. 7 shows the resulting FIG. 6 ZDD after removal of unused nodes.

The ZDD of FIG. 7 shows the result of removing unused enumerations of the ASInclude ZDD 132, which it now becomes the new or modified ASInclude ZDD 136. The "one" node 138 lies at the bottom of ZDD 136.

Add Always Paths to Include:

The ASInclude ZDD of FIG. 7 for the AutoSelect component now has all of the possible included paths. These paths are not complete because they only contain enumeration nodes 4 through 16. A next step involves expanding out the paths to include all of the attributes in the AutoSelect component.

An "Add Always" routine adds cover details for all attributes from the AutoSelect component that reside only in the ASExclude ZDD. A cover or "set cover" is defined by, e.g., Paul E. Black, in *Dictionary of Algorithms and Data*

*Structures*, Paul E. Black, ed., U.S. National Institute of Science and Technology, Dec. 17, 2004. Cover details are also explained in commonly-owned copending provisional application Ser. No. 60/721,089, incorporated by reference herein.

Figure 8:
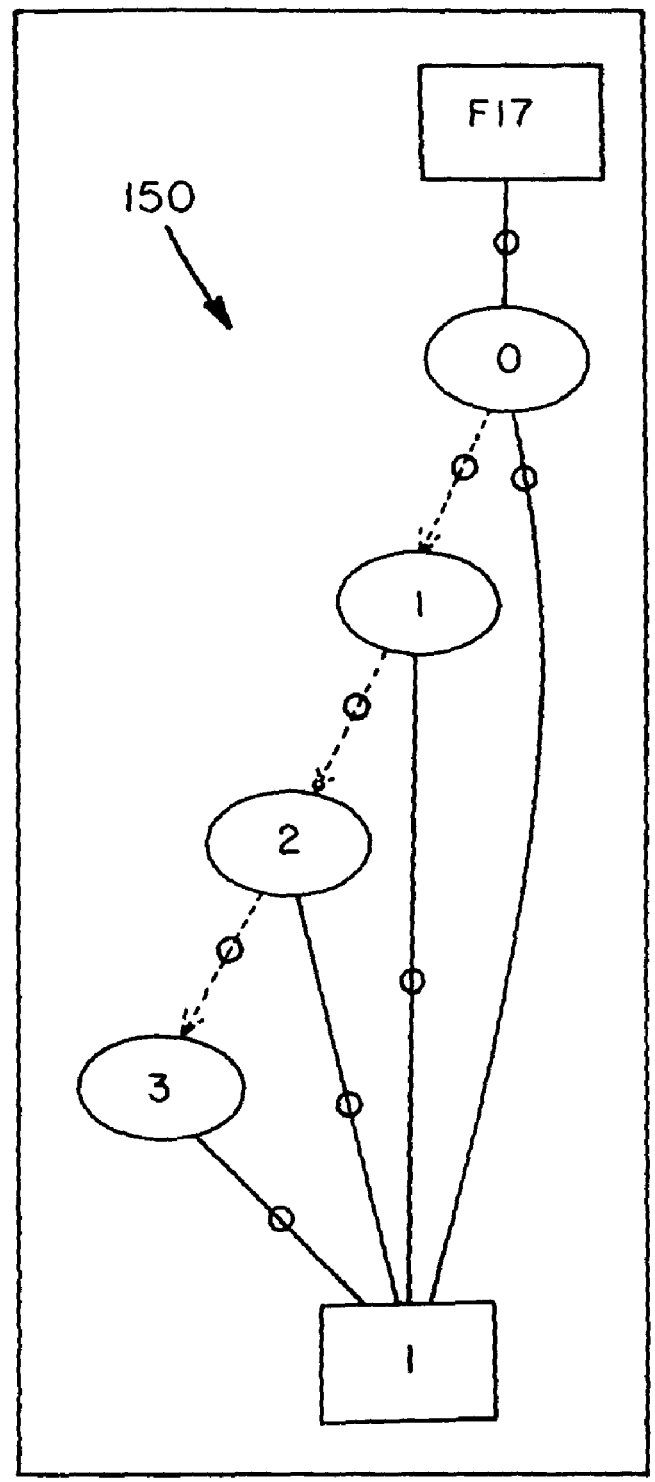
FIG. 8 shows an XOR (exclusive OR) ZDD that is used to expand out the paths in the ZDD of FIG. 7 to include all of the attributes.

In our example, Attribute 0 resides only in the ASExclude ZDD, but not the ASInclude ZDD. According to the present invention, an aspect thereof adds an XOR cover for "0" attribute. ZDD 150 of FIG. 8 shows the XOR cover that is added to (i.e., combined by multiplying) the ASInclude ZDD. If there was another attribute residing only in the ASExclude ZDD, an aspect of the invention would effect adding in another XOR cover for that attribute. The standard UnateProduct of algorithm described in F. Somenzi, *CUDD: CU Decision Diagram Package*, is used to "multiply" the two ZDDs.

Figure 9:
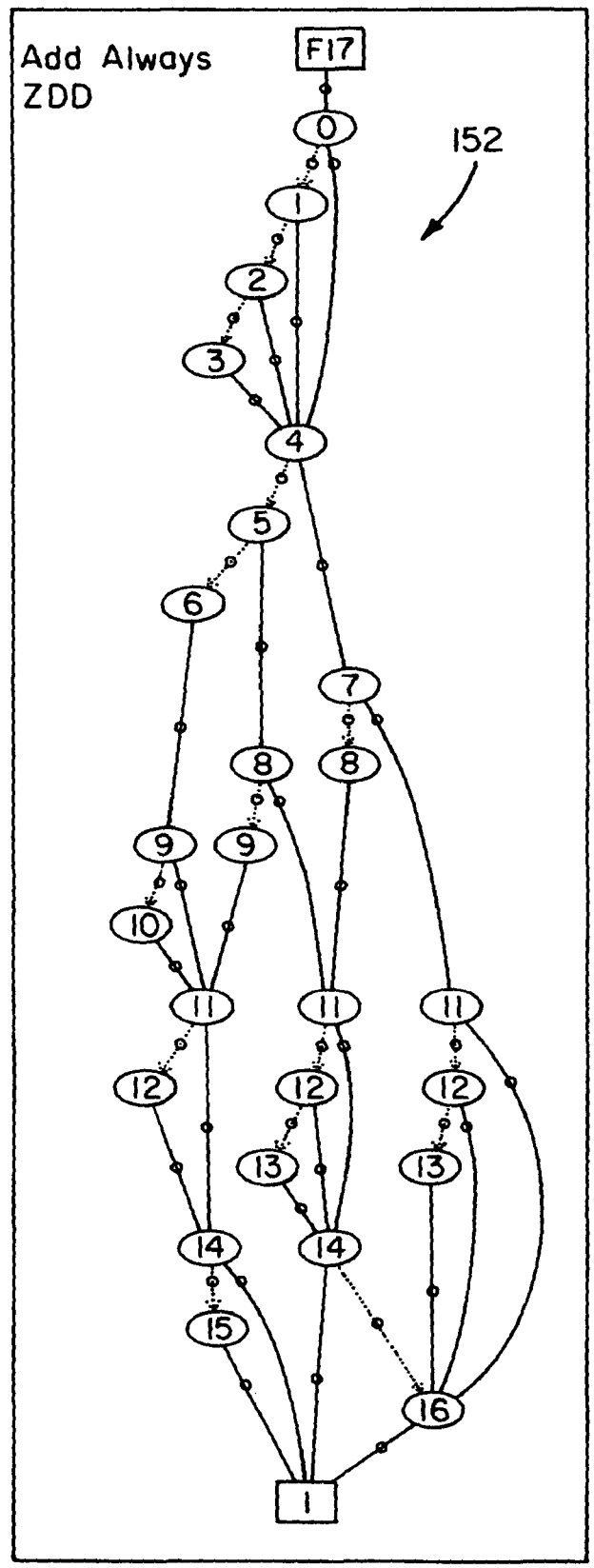
FIG. 9 shows the ZDD of FIG. 7 expanded out by the XOR ZDD of FIG. 8.

The resulting ZDD 152 of FIG. 9 contains all included combinations for the AutoSelect component. ZDD 152 thus becomes the new or modified ASInclude ZDD. The next step involves removing those combinations that are excluded by the ASExclude ZDD.

Transferring Exclude to Include:

The rule processing system or method may employ a ZDD manager to keep ZDDs with different ordering and sets of enumerations separated so as to minimize the total amount of memory needed to process the ZDDs. The ZDD manager also keeps the ordering information and the canonicity of its ZDDs.

At this point there is produced an ASInclude ZDD with all possible Included combinations and an ASExclude ZDD that contains the combinations to be excluded. The two ZDDs may be maintained by separate ZDD managers. Before removal of the excluded paths from the ASInclude ZDD, both the ASInclude ZDD and ASExclude ZDD are preferably handled by the same ZDD manager. To accomplish this, the ASExclude ZDD may be transferred into the ASInclude ZDD manager space.

The transfer routine is called TransferZDD, which transfers a ZDD from one ZDD manager space to another. It decomposes a ZDD in its existing ZDD manager using a Shannon Expansion described in C. E. Shannon, *The synthesis of two-terminal switching circuits*, Trans. of the American Institute of Electrical Engineers, 28, 1, 59-98, (1949), and then reassembles the ZDD in the new manager space using a ZddITE operation. ITE is shorthand for If-Then-Else.

Both of these routines, TransferZDD and ZddITE, are similar to standard routines written for BDDs, as explained in F. Somenzi, *CUDD: CU Decision Diagram Package*.

The ASExclude ZDD in the new ZDD manager space looks exactly like it did in the ASExclude ZDD manager, but it has different node memory addresses because it is now ordered and managed by the ASInclude ZDD manager.

Removal of Excluded Paths

With both ZDDs being handled by the same manager, operations can be performed that involve both ZDDs, including removal of excluded combinations from the ASInclude ZDD.

This operation can result in relatively large ZDDs because the information from two ZDD is merged into a single ZDD. Specifically, all possible valid combinations are represented in one ZDD. Care should be taken to minimize the size of the ASInclude and ASExclude ZDDs up to this point.

Figure 10:
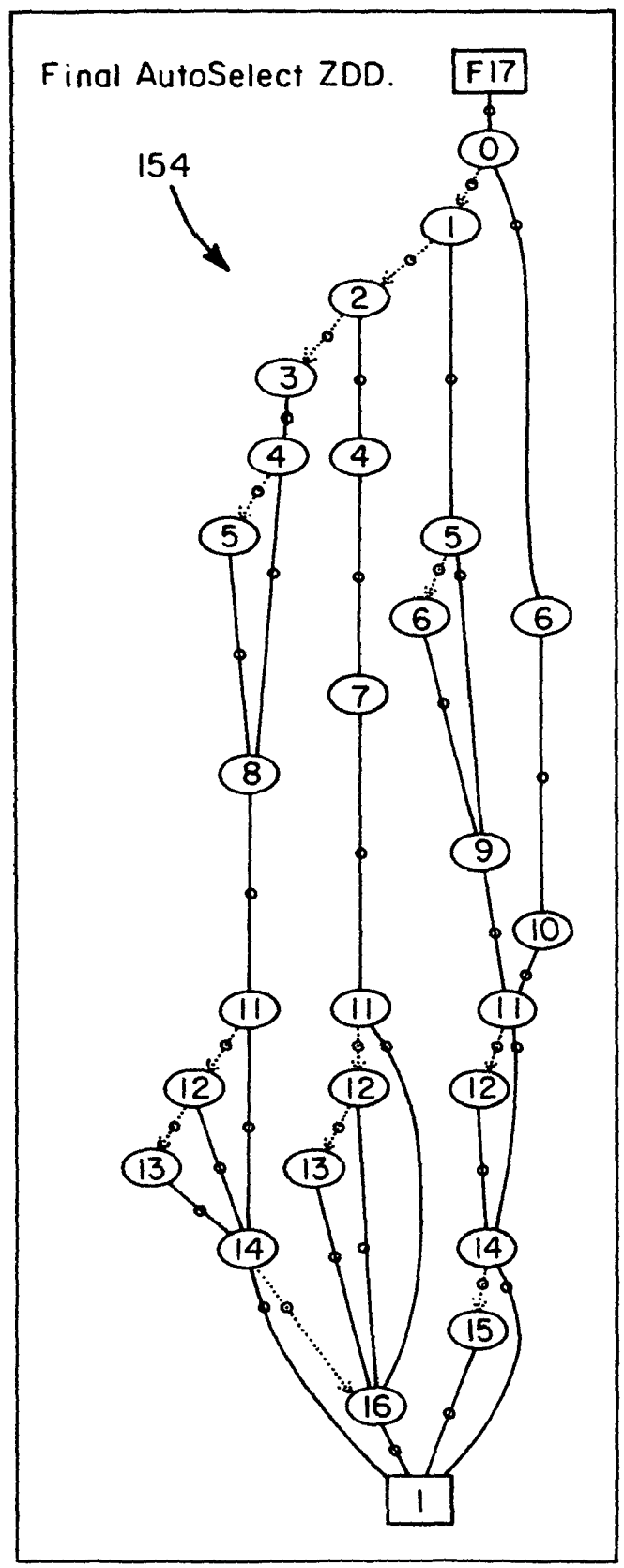
FIG. 10 is a final AutoSelect ZDD that is used to automatically select attribute enumerations based on initial user-selected enumeration(s). It is a combination of an ASInclude ZDD possessing all possible Included combinations and an ASExclude ZDD having certain Excluded combinations.

After all of the excluded combinations have been removed from the ZDD, there is produced a Final ZDD 154, as shown in FIG. 10. At this point, the Final ZDD 154 may be reordered using conventional reordering techniques of F. Somenzi, *CUDD: CU Decision Diagram Package*, in order to reduce its size.

Store the AutoSelect Component ZDD.

The Final AutoSelect ZDD 154 of FIG. 10 is stored in a packaged file for the AutoSelect component using the techniques described in the related disclosures Ser. Nos. 10/101,151 and 10/101,154. Both AutoSelect component ZDDs are processes similarly.

Alternate Method of Building AutoSelect ZDDs (At Runtime):

When the AutoSelect ZDDs are built at runtime, they may be constructed as described above with respect to packaging. To implement the AutoSelect feature at runtime, the steps (Reordering ZDDs, Removal Unused Enumerations, Adding Always Paths to Include, Transferring Exclude to Include, and Removal of Excluded Paths) as described above are performed upon loading of the execution engine. Also, the steps described above need only be performed once per AutoSelect component. So the runtime engine may also perform those operations and cache the results for future iterations. At the beginning of every execution engine cycle, the same AutoSelect component ZDD is used and a Fix Selections routine (described later) is called.

Putting this type of code into the execution engine requires a more sophisticated execution engine. Depending upon the implementation language, the runtime execution engine may be over worked. Creating all of the AutoSelect Component ZDDs at packaging time has advantage in that precious time may be saved during runtime and that the runtime engine only has to deal with executing the AutoSelect ZDDs.

Executing the AutoSelect Components at Runtime:

For every AutoSelect component, packaging creates a list of the attributes in the component, an AutoSelect ASInclude ZDD, and a list of critical attributes.

Attribute List

The list of attributes contains all of the attributes involved in the AutoSelect component. This list is sorted in an AutoSelect Priority order. At design time, a rule modeler assigns an AutoSelect Priority value to every auto-selectable attribute. Any ties in the ordering are resolved by alphabetically sorting the attribute name. If the modeler does not set the AutoSelect Priority for attributes, the AutoSelect Priority order is alphabetical by attribute name.

ASInclude ZDD

The AutoSelect ASInclude ZDD has all valid combinations for all of the attributes in this AutoSelect Component. The preceding section described in detail how to create an ASInclude ZDD.

Critical Attributes

The critical attribute list has all of the attributes determined to be critical during rule packaging. An attribute is only selected to be a critical attribute if it was defined, for example, to never allow a floating state. Thus, it may be an illegal condition for any of the critical attributes to be found in a floating state at run time.

The system cannot determine the floating AutoSelect values for the AutoSelect Component when in this illegal state. So, if any critical attribute is floating, the system or method sets all of the floating AutoSelect attributes in the AutoSelect component to their default value, and exits the AutoSelect algorithm.

Fix Selections Routine

A FixSelections routine is used by AutoSelect to find the best combination based on the current set of user inputs. Every attribute in the AutoSelect component has an enumeration selected and the system or method finds the best enumeration for each attribute. During creation of the AutoSelect component, the attribute list is placed in AutoSelect Priority order so it becomes a matter of finding the best enumeration value for each attribute in that order.

A Recommended Order routine is used to find the best enumeration. At the time of rule design, the modeler may specify the order in which enumerations are recommended. If the Recommended Order is not specified, the method of apparatus of the invention may be arranged to default to an alphabetical order by enumeration name.

For the illustrated example, the AutoSelect Priority is alphabetical and the Recommended Order for each attribute is also alphabetical. It is then considered how to handle AutoSelecting the enumerations for the first AutoSelect Component.

The operation is started by obtaining all of the attribute values for non-AutoSelected attributes in the group.

Figure 11:
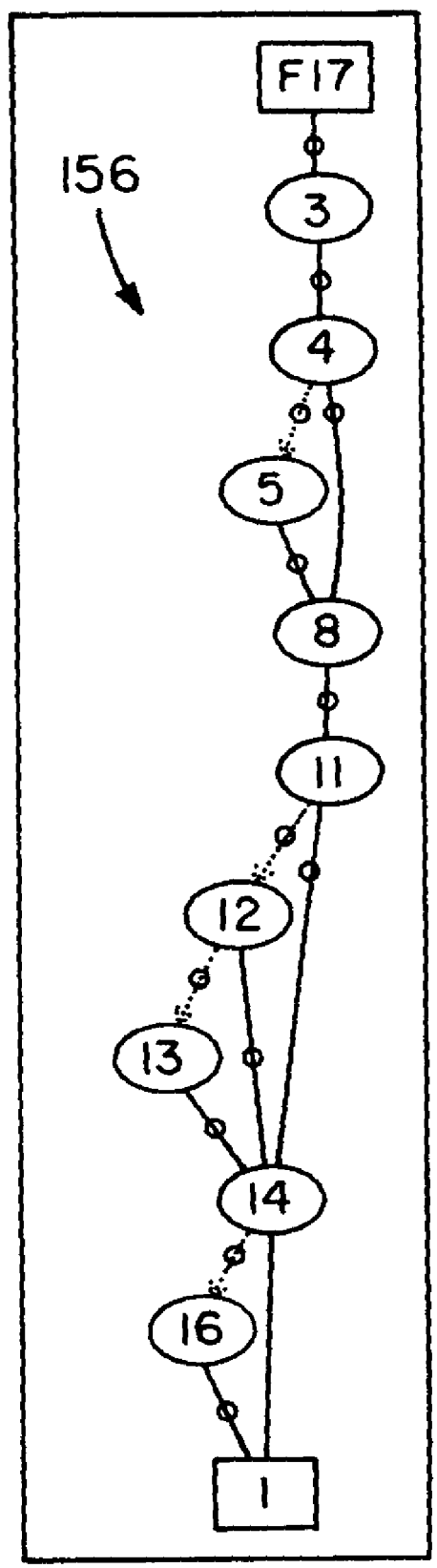
FIG. 11 is an intermediate ZDD generated by a user-selection of the "good" enumeration in the bundles attribute of the illustrated rule, which is a ZDD representation of all valid combinations that have enumeration 3.

In the illustrated example, it is shown what happens when a user selects the "Good" enumeration from the "Bundle" attribute 102 (FIG. 1), which is enumeration 3 in FIG. 11. The AutoSelect feature starts with the ASInclude ZDD. Then, it removes all paths that do not have the enumeration 3 in them. The resulting ZDD 156 is shown in FIG. 11, which is a Zdd representation of all valid combinations that have enumeration 3. There are twelve paths in ZDD 156, which means that there are twelve valid combinations that use the "Good" enumeration.

If the ZDD 156 was empty at this point, then there are no valid combinations having the user selection. This means that, with the given values for the non-AutoSelected attributes, there were no valid combinations of AutoSelect values. In this case, the AutoSelect feature of the invention sets all of the floating attributes to their default enumeration values, and is done.

If the ZDD 156 is not empty, there are one or more valid combinations. The AutoSelect feature now seeks to find the best valid combination.

At this point, AutoSelect goes through the ordered list of attributes in the AutoSelect component to find the highest recommended enumeration for each attribute. The existence of an enumeration in the ZDD 154 implies that it resides in some valid combination(s). AutoSelect may then fix this value in the ZDD and look to the next attribute in the AutoSelect Component. When all the attributes have fixed enumerations, the combination is valid and the system or method provides to the user these enumerations as recommended selections for the AutoSelect Attributes.

Figure 12:
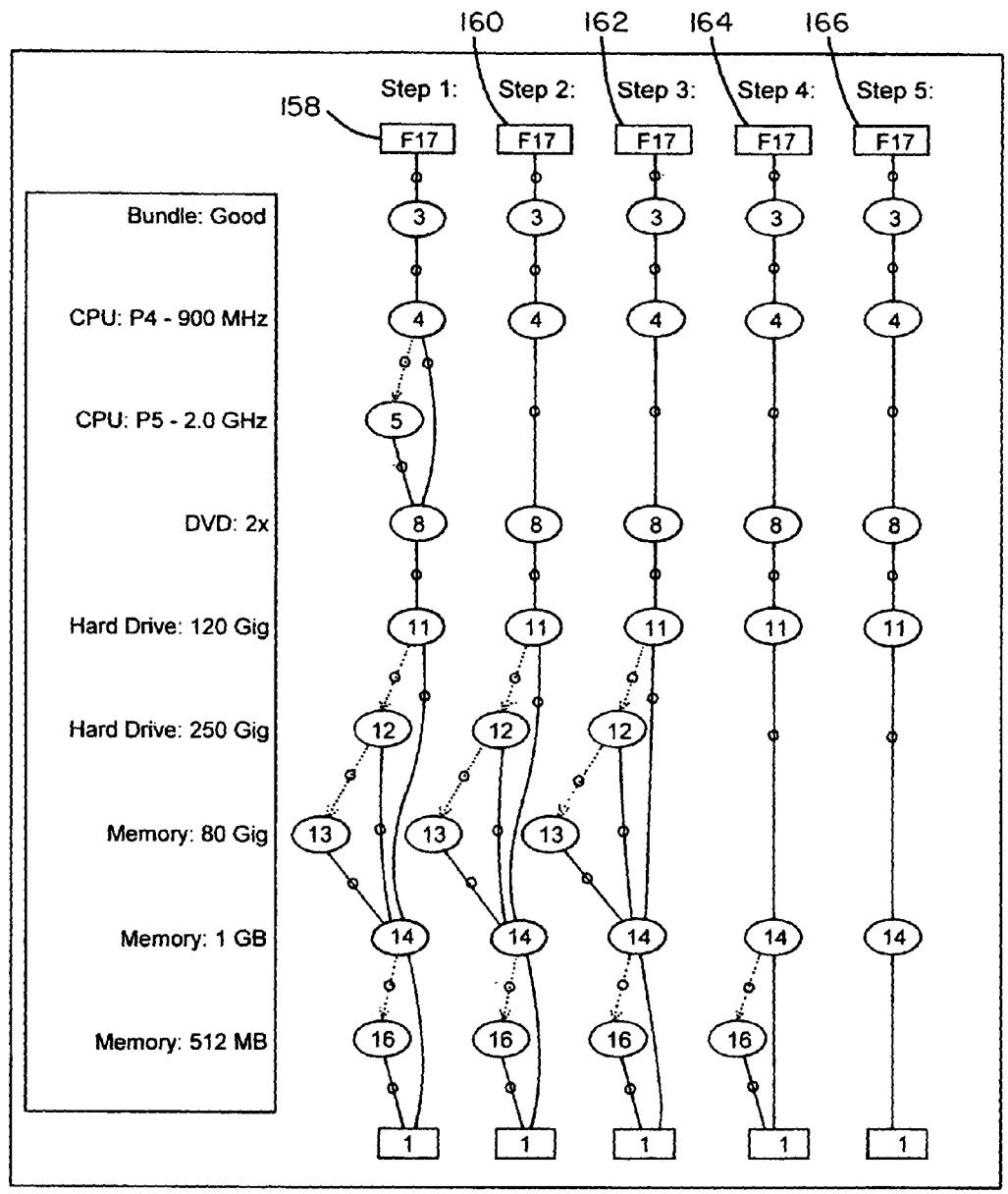
FIG. 12 shows a series of ZDDs internally generated by the invention in order to produce recommended enumeration selections based on an initial user-selection of the "cheap" enumeration for the bundles attribute.

FIG. 12 illustrates the steps of providing advice to a user. Notice that the more selection the system makes, the more refined the ZDD becomes and the fewer valid combinations are available.

Step 1: Enumeration 3 in ZDD 158 is fixed because the user selected the Good Bundle.

(In steps Step2-Step 5: the attributes are fixed from the AutoSelect Attribute list.)

Step2: Enumeration 4 in ZDD 160 is the highest recommended enumeration for CPU attribute. Note that enumeration 5 is removed.

Step3: Enumeration 8 in ZDD 162 is the highest recommended enumeration for DVD attribute.

Step4: Enumeration 11 in ZDD 164 is the highest recommended enumeration for Hard Drive attribute. Enumerations 12 and 13 are removed.

Step5: Enumeration 14 in ZDD 166 is the highest recommended enumeration for Memory attribute. Enumeration 16 is removed. At this point there is a single valid path. These enumeration values are used as the selections for the AutoSelected Attributes.

Advice Changes to Support AutoSelect:

The related disclosures describe, in detail, how to generate advice for a set of user selections on a given set of attributes. The present invention extends that advice generation to handle AutoSelected attributes. The AutoSelect operation is completed before the advice routine starts, but the results of the AutoSelect operation are used by the advice routine in several ways.

If there are no valid AutoSelect combinations, the AutoSelect feature selects default values for all AutoSelect attributes. This has an effect on advice for any related attributes. After auto-selections are determined (whether valid or invalid), user advice for each enumeration is determined, one attribute group at a time. The advice computation comprises three steps, with context switching based on whether the attribute group is an auto-select group with no user selections. Include and Exclude advice differs in their respective computations.

FIG. 13 summarizes how advice is computed using AutoSelect Attributes. The Cheap selection of Bundle attribute group 172 and the P4 selection of CPU attribute group 174 are selected. On the left side of FIG. 13 are columns 182, 184, and 186 showing the results of Include and Exclude advice. Note that there are two columns for Exclude results 184. The left Exclude Column is computed with fixed selections, and the right Exclude Column is computed with the floating selections. The Result column 186 is a NOR operation between the Include and the Exclude columns 182 and 184. The following three sections describe how to compute the details of Include Advice, Exclude Advice and how the AutoSelect feature combines them to provide Overall Advice to a user.

Include Advice

FIG. 15 shows advice indications for the respective Bundles, CPU, DVD, Hard Drive, and Memory attribute groups in row 196. Selectable enumerations for the groups appear in row 197. For Include advice, AutoSelect creates two arrays 192 and 194 (FIG. 14) of enumeration inputs, one called Selection Input Floating and a second called Selection Input Fixed. Array 192 has all of the user selections and preferably all of the floating AutoSelect attributes with their AutoSelected values. Array 194 has all of the user selections and preferably all of the floating AutoSelect attributes are seen as if they were floating. As the advice for each attribute is calculated, the attribute values for related attributes are pulled from one of these arrays. If the attribute is a floating AutoSelect attribute, the values for the Selection Input Fixed array are used. All other attributes use the values from the Selection Input Floating array.

As describe above, Include Advice uses one of the two input arrays shown in FIG. 14, depending upon whether or not an AutoSelect attribute is floating, to generate the Include result depicted in FIG. 15. The computation of Include Advice values, however, is unchanged from that shown in incorporated application Ser. No. 10/101,151 (now U.S. Pat. No. 6,965,887).

The illustrated example assumes that the user has made a selection of the "Cheap" enumeration in the Bundles attribute group and "1×" in the DVD attribute group. Advice for all five groups will proceed with two initial contexts. For Bundles and DVD, since they are attribute groups with a user selection of enumerations, CPU, Hard Drive and Memory will appear as if they are floating since no selection has been made.

The Advice module for the Include rules will return all pluses (e.g., "available" or "compatible" selections) in both of these attributes since they are not in any Include rule together (the example assumes that Bundles and DVD reside in an Exclude rule, and that DVD, CPU, Hard Drive and Memory reside in an Include rule).

Since all other attributes are considered floating, they cannot affect the advice associated with Bundles and DVD selections. For CPU, Hard Drive and Memory, all attributes will appear as if they have a selection (with the auto-selection appearing as the selection in auto-selected attributes). Hence, CPU will show a "+" sign on "P4", as "P4" is the only valid selection with the "Cheap" selection. Hard Drive will show all pluses, and Memory will show a "+" on "512 MB" (the only valid choice with "Cheap"). In FIG. 15, the "0" notation in row 198 is associated with a "minus" notation for user advice while the "1" notation is associated with a "plus" notation for user advice.

Exclude Advice

FIGS. 16A and 16B show Exclude advice. Determination of Exclude advice is simultaneously performed for all attributes as described in the aforementioned incorporated patent applications Ser. No. 10/101,151 (now U.S. Pat. No. 6,965,887) and Ser. No. 10/101,154, so the process for determining whether to use the AutoSelected or floating values for AutoSelected attributes is different. To support AutoSelect, Exclude advice is calculated twice, once with AutoSelected attributes in a floating state and once with AutoSelected attributes using their AutoSelected values. In FIG. 16A, row 200 identities the attribute groups, row 201 indicates selectable enumerations for the respective attribute groups, and row 202 indicates advice. In FIG. 16B, row 203 also represents advice provided to the user.

The grids of FIGS. 16A and 16B show the resulting Exclude advice results in row 202 and 203 for the illustrated example. FIG. 16A shows advice computation in row 202 using floating AutoSelected Attributes. FIG. 16B shows advice computation in row 203 using a fixed AutoSelect value instead of the floating AutoSelect Attributes. The significance and interpretations of the results shown in rows 202 and 203 are similar to that described in connection with FIG. 15.

Overall Advice

FIG. 17 illustrates details the changes from the overall advice disclosed in incorporated disclosures Ser. No. 10/101, 151 (now U.S. Pat. No. 6,965,887) and Ser. No. 10/101,154 where the Include Results and the Exclude Results are NOR'ed to produce advice array 206. In FIG. 17, row 204 identifies the attribute group, row 205 identifies enumerations within the respective attribute groups, and row 206 indicates the advice provided to the user. To support AutoSelect, the NOR operation considers both of the Exclude Result arrays 202 and 203 (FIGS. 16A and 16B). During the NOR operation, the system uses the values from the floating array for attributes that are fixed, and from the fixed array for attributes that are floating.

As described in the incorporated related disclosures, Autoselect inspects each enumeration in the Include Result array from left to right. The difference here is that if the enumeration is in a floating AutoSelect attribute, the system or method uses the enumeration value from the Exclude Fixed Result array 202, and if the enumeration is from a fixed attribute, the system uses the enumeration value from the Exclude Floating Result array 203. AutoSelect uses those values to produce the final NOR result array 206 shown in FIG. 17. In other words, the results/advice shown in array 206 (FIG. 17) results from a NOR operation of the results/advice of arrays 202 and 203 (FIGS. 16A and 16B).

According to the illustrated example, it is seen that AutoSelect feature may be implemented as a method or in a computer apparatus to facilitate the selection of choices by a user during rule processing or decision automation. AutoSelect may be deployed to assist a user in processing a business or engineering rule. Although shown with a single user input, any number of available attributes may be designated user-selectable, "floating," or "fixed." DAGs or BDDs, under certain circumstances may also be used to carry out the invention. The underlying teachings hereof may also be emulated to achieve the same or similar result. Accordingly, the invention is not limited by the illustrated examples but includes all such variations and emulations as may come within the scope of the appended claims.

The invention claimed is:

1. A computer-implemented rule processing system, comprising:
    a graphical interface configured to display a plurality of inputs corresponding to a plurality of attributes associated with a rule represented by a zero-suppressed binary decision diagram (ZDD); and
    a processor configured to automatically identify, according to the ZDD, at least one of the plurality of inputs as compliant with the rule responsive to selection of at least another of the plurality of inputs using the graphical interface;
    wherein the graphical interface is configured to display the at least one of the plurality of inputs and to indicate the at least one of the plurality of inputs as being either in a floating state or a fixed state responsive to an autoselect indication associated with at least one corresponding attribute or enumeration in the ZDD;
    wherein the fixed state is configured to indicate a fixed enumeration value for the at least one attribute or enumeration corresponding to the at least one of the plurality of inputs; and
    wherein the floating state is configured to indicate no fixed enumeration value for the attribute or enumeration corresponding to the at least one of the plurality of inputs.

2. The computer-implemented rule processing system of claim 1, wherein each of said plurality of attributes includes at least one corresponding enumeration.

3. The computer-implemented rule processing system of claim 1, wherein the processor is configured to separately build an autoselect Include ZDD and an autoselect Exclude ZDD to represent the ZDD.

4. The computer-implemented rule processing system of claim 3, wherein the processor is configured to reorder one or more nodes of the autoselect Include ZDD or one or more nodes of the autoselect Exclude ZDD to reduce the complexity thereof.

5. The computer-implemented rule processing system of claim 4:
    wherein one or more nodes of the autoselect Include ZDD or the autoselect Exclude ZDD have respective index numbers associated with the attributes and enumerations thereof; and
    wherein the processor is configured to align the indices of respective nodes of the autoselect Include ZDD or the autoselect Exclude ZDD to facilitate processing.

6. The computer-implemented rule processing system of claim 5, wherein the processor is further configured to build the ZDD during rule packaging to reduce processing time during execution of the rule.

7. The computer-implemented rule processing system of claim 5, wherein the processor is further configured to build the ZDD on-the-fly during runtime of the rule.

8. A computer-implemented rule processing system utilizing a zero-suppressed binary decision diagram (ZDD) rule model that responds to selection of enumerations of attributes to provide selection advice to achieve compliancy of the rule model, the system comprising:
a user interface to enable selection of an initial input enumeration from a plurality of enumerations displayed on a display device;
a processor configured to:
construct an autoselect ZDD from compliant enumerations of the rule model; and
automatically provide additional compliant selections of enumerations using the autoselect ZDD based at least in part on the selected initial input enumeration;
wherein the autoselect ZDD is configured to identify at least some of the additional compliant enumerations as autoselect enumerations;
wherein the user interface is configured to display the additional compliant enumerations and to display at least some of the autoselect enumerations as floating or fixed;
wherein the fixed state is configured to indicate a fixed value for a corresponding autoselect enumeration; and
wherein the floating state is configured to indicate no fixed value for the corresponding autoselect enumeration.

9. The computer-implemented rule processing system of claim 8, wherein the processor is further configured to divide the autoselect ZDD into an autoselect Include ZDD and an autoselect Exclude ZDD prior to automatically providing the additional compliant selections.

10. The computer-implemented rule processing system of claim 9, wherein the processor is further configured to provide alternative compliant inputs based at least in part on a change in the initial input enumeration.

11. A computer-implemented rule processing system to determine satisfiability of a rule represented by a zero-suppressed binary decision diagram (ZDD), the system comprising:
an autoselect processing module configured to provide automatic selection of enumeration values compliant with the ZDD;
an interface to enable a user to graphically select an initial enumeration value for at least one enumeration; and
a processing module configured to determine compliant enumeration values for other attributes according to the initial enumeration value selected and to provide the compliant enumeration values of said other attributes including a state associated with at least some of the said other attributes identified as autoselect enumerations or attributes in the ZDD, to the interface for display;
wherein the state is configured to indicate a fixed or floating value for a corresponding one of said other attributes.

12. The computer-implement system of claim 11, wherein the processing module is further configured to iteratively enable the user to select an alternative enumeration value whereby, in response, the processing module automatically identifies other compliant enumeration values based on the alternative enumeration value selected by the user.

13. A computer-implemented rule processing method, comprising:
obtaining a selection of at least one enumeration value of an attribute selected using a graphical interface on a monitor displaying a plurality of enumeration values for respective attributes of a rule including displaying a state associated with at least some of the attributes;
determining a set of compliant enumeration values of other attributes according to the selection using a zero-suppressed decision diagram (ZDD) representation of the rule; and
automatically graphically displaying on the monitor, a complete set of compliant enumeration values including displaying the state associated with some of the attributes corresponding to the complete set of enumeration values; and
iteratively enabling selection of other enumeration values to provide further complete sets of compliant enumeration values using the ZDD;
wherein the state is configured to indicate a fixed or a floating value for an associated attribute.

14. A computer-implemented method of rule processing utilizing a zero-suppressed binary decision diagram (ZDD) to provide decision support, the method comprising:
indicating, using a graphical interface displayed on a display device, at least one input to the ZDD;
using the ZDD to generate a set of additional inputs that are compliant with each other and compliant with the at least one input responsive to the at least one input; and
using the graphical interface to display the set of additional inputs that are compliant on the display device including displaying a state associated with at least some of the additional inputs;
wherein the state is configured to indicate a fixed or a floating value for an attribute associated with each of the at least some of the additional inputs.

15. The computer-implemented method of claim 14, wherein using the graphical interface includes providing inputs in the form of attributes and enumeration values of the attributes.

16. The computer-implemented method of claim 15, further comprising:
building an autoselect ZDD based on compliant inputs of a ZDD rule; and
processing the autoselect ZDD to produce a complete set of compliant inputs to the ZDD according to the at least one input.

17. The computer-implemented method of claim 16, further comprising separately building an autoselect Include ZDD and an autoselect Exclude ZDD to represent the autoselect ZDD to facilitate manipulation of the autoselect ZDD.

18. The computer-implemented method of claim 17, further comprising reordering nodes of the autoselect Include ZDD and nodes of the autoselect Exclude ZDD to reduce the number of nodes and complexity thereof.

19. The computer-implemented method of claim 18, wherein the nodes of the autoselect Include ZDD or the nodes of the autoselect Exclude ZDD have respective index numbers associated with the attributes and enumeration values thereof and wherein the separately building includes aligning the indices of the respective nodes of the autoselect Include ZDD and the autoselect Exclude ZDD to facilitate manipulation of the autoselect ZDD.

20. The computer-implemented method of claim 19, further comprising separately building the autoselect ZDD during rule packaging to reduce processing time during execution of the rule processing system.

21. The computer-implemented method of claim 19, further comprising separately building the autoselect ZDD on-the-fly during runtime.

22. A computer-readable medium having instructions stored thereon that, in response to execution by a device, cause the device to perform operations comprising:
- displaying, on a graphical user interface, selectable inputs for a rule represented by a zero-suppressed decision diagram (ZDD);
- selecting at least one input;
- building an autoselect ZDD representative of the ZDD rule including identifying enumerations or attributes associated with at least some of the selectable inputs as autoselect;
- automatically generating a set of compliant inputs using the autoselect ZDD responsive to the selected at least one input; and
- displaying on a display device the set of compliant inputs including displaying a state indicative of a fixed or floating value associated with at least some inputs in the set of compliant inputs responsive to the identification of the associated enumerations or attributes as autoselect.

* * * * *

UNITED STATES PATENT AND TRADEMARK OFFICE
CERTIFICATE OF CORRECTION

PATENT NO. : 7,761,397 B2  Page 1 of 1
APPLICATION NO. : 11/527638
DATED : July 20, 2010
INVENTOR(S) : Huelsman et al.

It is certified that error appears in the above-identified patent and that said Letters Patent is hereby corrected as shown below:

Page 2, item (56), under "Other Publications", in Column 2, Line 1, delete "Zero-Supressed" and insert -- Zero-Suppressed --.

Page 2, item (56), under "Other Publications", in Column 2, Line 12, delete "Auxilary" and insert -- Auxiliary --.

Page 2, item (56), under "Other Publications", in Column 2, Line 61, delete "Patentablility;" and insert -- Patentability; --.

Page 2, item (56), under "Other Publications", in Column 2, Line 63, delete "Patentablility;" and insert -- Patentability; --.

Signed and Sealed this
Tenth Day of April, 2012

David J. Kappos
*Director of the United States Patent and Trademark Office*